US012182677B1

(12) United States Patent
Smith et al.

(10) Patent No.: US 12,182,677 B1
(45) Date of Patent: Dec. 31, 2024

(54) APPARATUS AND METHODS FOR CONDITIONING RAW DATA BASED ON TEMPORAL INTERPOLATIONS TO GENERATE OPTIMAL EXTRAPOLATIONS OF AN ENTITY

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/586,893

(22) Filed: Feb. 26, 2024

(51) Int. Cl.
*G06N 20/00* (2019.01)

(52) U.S. Cl.
CPC .................... *G06N 20/00* (2019.01)

(58) Field of Classification Search
None
See application file for complete search history.

(56) References Cited

U.S. PATENT DOCUMENTS

| 11,551,024 B1 | 1/2023 | Lomont |
| 2009/0164311 A1 | 6/2009 | Deyo |
| 2020/0344252 A1* | 10/2020 | Menon ................ G06F 11/3006 |
| 2021/0056430 A1* | 2/2021 | Wu ......................... G06N 3/006 |
| 2022/0342861 A1* | 10/2022 | Gonzalez Macias ........................ G06F 16/24568 |
| 2023/0138423 A1 | 5/2023 | Wurmfeld |
| 2023/0267177 A1* | 8/2023 | Lomont ................ G06N 20/00 707/737 |

OTHER PUBLICATIONS

James G, Witten D, Hastie T, Tibshirani R. An introduction to statistical learning. New York: springer; Jun. 2013, corrected 8th printing 2017. 441 pages. (Year: 2013).*

* cited by examiner

*Primary Examiner* — Vincent Gonzales
(74) *Attorney, Agent, or Firm* — Caldwell Intellectual Property Law

(57) ABSTRACT

An apparatus for conditioning raw data based on temporal interpolations to generate optimal extrapolations of an entity, comprising a processor and a memory containing instructions configuring the processor to receive raw data associated with a temporal element from an entity condition the raw data, wherein conditioning the raw data includes clustering the raw data into primary clusters, wherein clustering the raw data includes dividing each primary cluster into a plurality of secondary clusters each contains a corresponding temporal interpolation, and ranking the plurality of secondary clusters as a function of the corresponding temporal interpolations, determine an extrapolation for each secondary clusters of the ranked plurality of secondary clusters based on the conditioned raw data, and generate a progression model as a function of the extrapolations.

20 Claims, 6 Drawing Sheets

APPARATUS AND METHODS FOR CONDITIONING RAW DATA BASED ON TEMPORAL INTERPOLATIONS TO GENERATE OPTIMAL EXTRAPOLATIONS OF AN ENTITY

FIELD OF THE INVENTION

The present invention generally relates to the field of machine learning. In particular, the present invention is directed to apparatus and methods for conditioning raw data based on temporal interpolations to generate optimal extrapolations of an entity.

BACKGROUND

Raw data may offer a rich resource for understanding patterns, behaviors, and trends. However, raw data often presents challenge due to its volume, heterogeneity, and complexity. Predictive models trained based on raw data that is improperly interpreted may not yield desired predictions and performance.

SUMMARY OF THE DISCLOSURE

In an aspect, an apparatus for conditioning raw data based on temporal interpolations to generate optimal extrapolations of an entity is described. The apparatus includes at least a processor and a memory communicatively connected to the at least a processor, wherein the memory contains instructions configuring the at least a processor to receive raw data associated with a temporal element from an entity, condition the raw data, wherein conditioning the raw data includes clustering the raw data into at least two primary clusters, wherein clustering the raw data into the at least two primary clusters includes dividing each primary cluster into a plurality of secondary clusters, wherein each secondary cluster of the plurality of secondary clusters comprises a corresponding temporal interpolation, and ranking the plurality of secondary clusters as a function of the corresponding temporal interpolations. The processor is further configured to determine an extrapolation for each secondary clusters of the ranked plurality of secondary clusters based on the conditioned raw data and generate a progression model as a function of the extrapolations.

In another aspect, a method for conditioning raw data based on temporal interpolations to generate optimal extrapolations of an entity is illustrated. The method includes receiving, by at least a processor, raw data associated with a temporal element from an entity, conditioning, by the at least a processor, the raw data, wherein conditioning the raw data includes clustering the raw data into at least two primary clusters, wherein clustering the raw data into at least two primary clusters includes dividing each primary cluster into a plurality of secondary clusters, wherein each secondary cluster of the plurality of secondary clusters comprises a corresponding temporal interpolation, and ranking the plurality of secondary clusters as a function of the corresponding temporal interpolations. The method further includes determining, by at least a processor, an extrapolation for each secondary clusters of the ranked plurality of secondary clusters based on the conditioned raw data, and generating, by the at least a processor, a progression model as a function of the extrapolations.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for conditioning raw data based on temporal interpolations to generate optimal extrapolations of an entity. In an embodiment, an apparatus receives raw data associated with a temporal element from an entity, clusters this data into primary and secondary clusters with each secondary cluster corresponding to a temporal interpolation and ranks these clusters. Based on this conditioned data, extrapolations for each secondary cluster are determined, which collectively form a progression model for the entity.

Aspects of the present disclosure can be used to refine raw data into a more structured and meaningful format, thereby improving the quality and accuracy of predictions derived from this data. Aspects of the present disclosure can also be used to identify critical temporal trends and patterns that may otherwise be obscured in unprocessed data. This is so, at least in part, because the approach of hierarchical clustering based on temporal interpolations provides deeper insights into the dynamics and evolution of the entity over time.

Aspects of the present disclosure allow for enhanced decision-making capabilities in machine learning models, where understanding temporal trends is critical. Exemplary embodiments illustrating aspects of the present disclosure are described below in the context of several specific examples.

Figure 1:
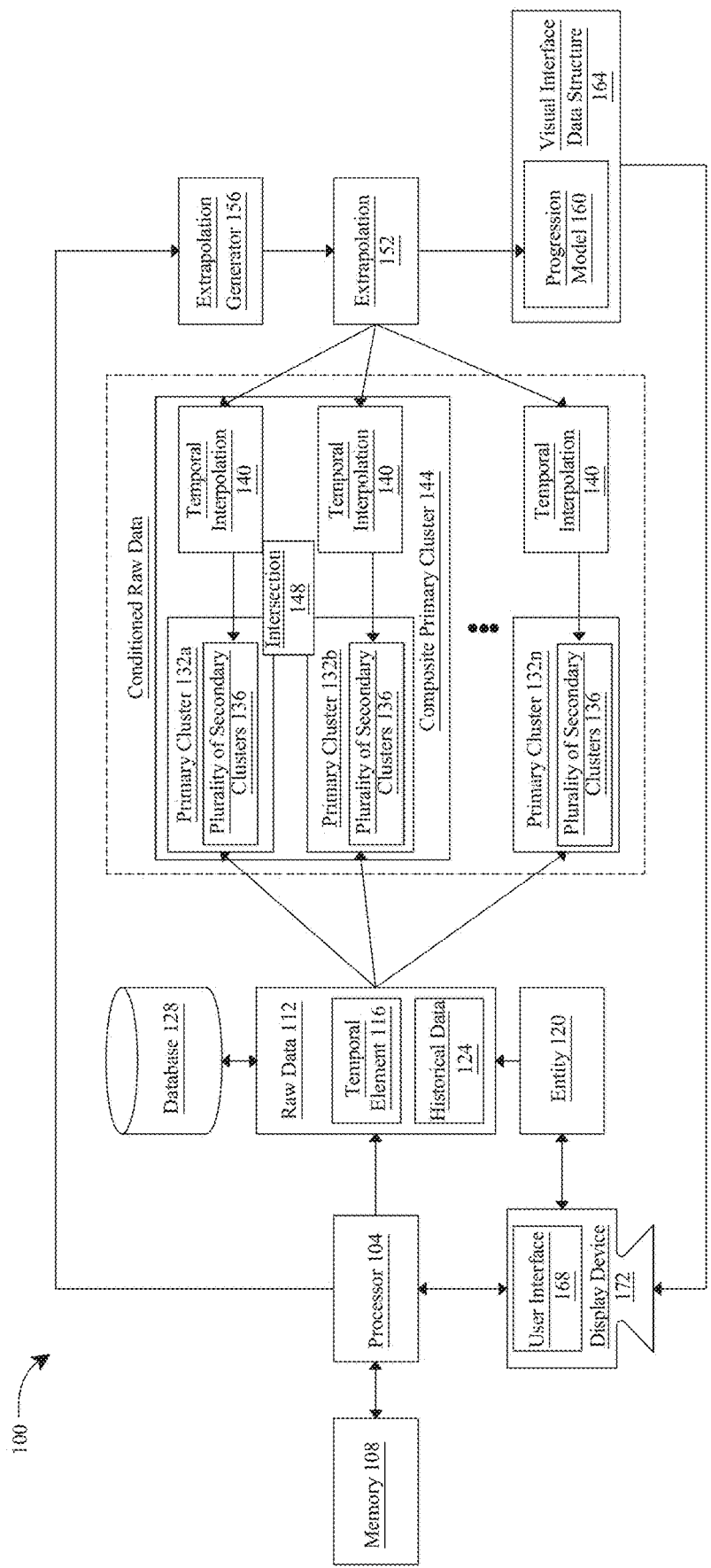
FIG. 1 is a block diagram of an exemplary embodiments of an apparatus for conditioning raw data based on temporal interpolations to generate optimal extrapolations of an entity.

Referring now to FIG. 1, an exemplary embodiment of an apparatus 100 for conditioning raw data based on temporal interpolations to generate optimal extrapolations of an entity is illustrated. Apparatus 100 includes at least a processor 104 communicatively connected to a memory 108, wherein the memory contains instructions configurating the at least a processor 104 to perform one or more processing steps as described in this disclosure below. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, processor 104 is configured to receive raw data 112 associated with a temporal element 116 from an entity 120. As used in this disclosure, "raw data" is unprocessed or unmodified information directly obtained from a source. In an embodiment, raw data 112 may include any information that has not undergone significant transformation (i.e., retains little to no resemblance to the original raw data or if its integrity is significantly different), cleaning, or structuring for analysis. In such an embodiment, raw data 112 may represent baseline form of information related to one or more events before any manipulation or interpretation. In some cases, raw data 112 may include a plurality of sensor readings (e.g., registered temperatures or other measurements over time) directly taken from sensors or electronic devices without any form of signal filtering, aggregation, or processing. In some cases, raw data 112 may include a plurality of user responses (e.g., survey response) containing direct answers or responses from entity 120 without any categorization, coding, interpretation. In some cases, raw data 112 may include a plurality of digital images taken by entity 120 using digital devices (e.g., .RAW file from a digital camera) stored in full resolution without compression, cropping, or editing. In some cases, raw data 112 may include a plurality of financial transactions (e.g., a list of a credit card transaction) containing direct records of monetary exchanges or trades without any aggregation, categorization, or summarization. In some cases, raw data 112 may include a plurality of direct system logs generated by one or more software systems, applications, or platforms that capture original events, actions, or errors (e.g., a server log).

With continued reference to FIG. 1, a "temporal element," for the purpose of this disclosure, is a component, an attribute, or a factor related to time. In some cases, temporal element 116 may signify a specific moment, duration, interval, or sequence in time. In an embodiment, temporal element 116 may include a precise point in time, for example, and without limitation, a timestamp (TS) in a format of "YYYY-MM-DD hh:mm:ss [.fraction]" with or without a fractional part included. In another embodiment, temporal element 116 may include a span or length of time. In a non-limiting example, temporal element 116 may include a first temporal element link to a second temporal element indicating a time span: "first TS—second TS." In some cases, the span or length may be measured in minutes, hours, days, weeks, or even years. In some cases, time span may be a decade (i.e., 10 years). Alternatively, temporal element 116 may include an interval i.e., a recurring period of regular interval between event occurrences, for example, "every x days," indicating a frequency of an event or an action. In a further embodiment, temporal element 116 may include a time line such as, without limitation, a timeline of a user's life events (e.g., graduation, marriage, first job, first car, etc.) wherein the time line may include a series of events or actions arranged in a chronological order.

With continued reference to FIG. 1, as used in this disclosure, an "entity" is a distinct unit, individual, object that produce raw data 112 as described herein. In an embodiment, entity 120 may include a single human being such as a user from whom data may be collected. In another embodiment, entity 120 may include an organization or company, for example, and without limitation, entity 120 may include a (structured) group of individuals (with a particular purpose e.g., business, government department, charity, and/or the like). In other embodiments, entity 120 may include one or more tangible items or equipment that may generate or be associated with raw data 112. In a non-limiting example, entity 120 may include one or more user devices, such as smartphones, laptops, desktops, among others that are capable of recording and transmitting raw data 112 (e.g., user data, usage data, location data, and/or the like). Additionally, or alternatively, entity 120 may include intangible or virtual units, such as, without limitation, software, or digital platforms. For example, and without limitation, entity 120 may include a user profile on a social media platform, representing a virtual identity with associated raw data e.g., posts, friends, interactions, and/or the like.

With continued reference to FIG. 1, in one or more embodiments, as described above, raw data 112 may include information related to one or more events (i.e., occurrences, actions, or interactions) involving entity 120. Exemplary events may include, without limitation, birthday, wedding, job interview, doctor visit, product launch, feature deployment, acquisition, business meetings, device activation or setup, maintenance service, device malfunction or error, software update, user account creation, user login or logout, data upload or download, user profile modification, business opening or closing, special events, networking events, site construction, and/or the like. In some cases, temporal element 116 may be associated with one or more events as listed above. In a non-limiting example, raw data 112 may include a data entry input by a user: "I started may exercise (running) at 7:00 AM this morning and ran for 30 minutes." In another non-limiting example, raw data may include historical data 124 pertaining to entity 120. As used in this disclosure, "historical data" is information collected from past events or over previous periods of time (i.e., temporal element). In a non-limiting example, historical data 124 may include, without limitation, user experience data, user feedbacks and reviews, user financial records, heath records, web report, climatic and weather data, organization's operational metrics, consumer behavior data and purchases history, academic achievements, courses schedules, chat histories and message logs, and/or the like. As a person skilled in the art, upon reviewing the entirety of this disclosure, will be aware of various type of raw data 112 may be received by processor 104.

With continued reference to FIG. 1, in some cases, raw data 112 may be received through direct input such as user inputs. In a non-limiting example, entity 120 e.g., users may directly enter data using one or more input devices e.g., mouse, keyboard, touch screens, voice commands and/or the like. In some cases, one or more storage mediums such as, without limitation, hard drives, solid-state drives, USB flash drives, memory cards, and/or the like may store raw data 112. Raw data 112 may be read by processor 104 from one or more storage mediums. In some cases, raw data 112 may be received over one or more network protocols, for example, processor 104 may download raw data 112 from the internet through protocols such as HTTP/HTTPS, FTP, or receiving raw data 112 through local networks. In cases where entity 120 includes one or more sensors, transducers, or other electronic devices, raw data 112 may be transmitted, in form of signal such as digital signal, electronic signal, and/or the like from entity 120 to processor 104. In some cases, transmission of raw data 112 may be achieved through wireless communication e.g., Wi-Fi, Bluetooth, NFC, cellular networks, and/or the like. In other cases, processor 104 may be configured to access raw data 112 from one or more third-party services using provided application programming interfaces (APIs). In a non-limiting example, processor 104 retrieve raw data 112 such as weather data from an external weather API or fetching social media posts from a platform's API. Additionally, or alternatively, raw data 112 may include a continuous flow of data. For instance, and without limitation, raw data 112 may include an organization's stock price real-time or near-real-time updates. Such raw data 112 may be received by processor 104 through a live data stream or processing video streaming data. In some cases, raw data 112 may be received from peripheral devices, for example, and without limitation, raw data 112 may include a digital document scanned by a scanner communicatively connected to processor 104. In other cases, raw data 112 may further include batch files or logs. In a non-limiting example, raw data 112 may include one or more periodic or scheduled data dumps (e.g., daily sales data). Receiving raw data 112 may include importing daily sales data from a log file at the end of a business day.

With continued reference to FIG. 1, in one or more embodiments, raw data 112 may be generated using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile the raw data 112. The web crawler may be seeded and/or trained with a reputable website, such as the user's business website, to begin the search. In some embodiments, the web crawler may be trained with information received from entity 120 through a user interface as described below. In some embodiments, the web crawler may be configured to generate a web query. A web query may include search criteria received from entity 120 e.g., user. For example, a user may submit a plurality of websites for the web crawler to search to extract raw data 112 e.g., inventory records, financial records, human resource records, historical data 124, sales records, user notes, observations and/or the like, based on temporal element 116 or other criteria such as location, event details, and/or the like.

With continued reference to FIG. 1, in some cases, raw data 112 may be fetched from database 128 communicatively connected to processor 104 using one or more database queries. Database 128 may be implemented, without limitation, as a relational database, a key-value retrieval database such as a NOSQL database, or any other format or structure for use as a database that a person skilled in the art would recognize as suitable upon review of the entirety of this disclosure. Database 128 may alternatively or additionally be implemented using a distributed data storage protocol and/or data structure, such as a distributed hash table or the like. Database 128 may include a plurality of data entries and/or records as described above. Data entries in database 128 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, processor 104 may be configured to receive raw data 112 through an optical character recognition or optical character reader (OCR); this may include automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-8. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2-4.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 is configured to condition raw data 112, wherein conditioning raw data 112 includes clustering the raw data into at least two primary clusters 132a-b. As used in this disclosure, a "cluster" is a group of data points that share similar characteristics. Clustering may refer to segmenting a heterogeneous dataset e.g., raw data 112 into homogeneous subsets i.e., plurality of clusters including at least two primary clusters 132a-b. In some cases, cluster may include a category assign to a particular event. A "primary cluster," for the purpose of this disclosure, is a first level of raw data segmentation. In a non-limiting example, each primary cluster of at least two primary clusters 132a-b may include a broad grouping based on a plurality of high-level similarities among a plurality of data points related to one or more events in raw data 112. In some cases, at least two primary clusters may include "Creativity event," "productivity event," "fitness event," "health event," and/or the like. In some embodiments, processor 104 may implement a feature learning algorithm to condition raw data 112. A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of historical data 124 (e.g., data describing historical events) and cluster raw data 112 into at least two primary clusters as a function of the detected co-occurrences of historical data 124. As a non-limiting example, feature learning algorithm may detect certain set of events frequently appear together or in close succession. For instance, processor 104 may use feature leaning algorithm to identify a feature such as a customer often buying sunscreen and sunglasses together based on historical data representing purchase histories of one or more customers.

With continued reference to FIG. 1, processor 104 is configured to divide each primary cluster of at least two primary clusters 132a-b into a plurality of secondary clusters 136a-n, wherein each "secondary cluster," for the purpose of this disclosure, is a second level i.e., finer level of data segmentation within each primary cluster as described above. In some cases, each secondary cluster of plurality of secondary clusters 136a-n may capture at least a more specific similarity among plurality of data points, refining the broader categorization of the corresponding primary cluster. In a non-limiting example, plurality of secondary clusters 136a-n may include subcategories or subgroups of the corresponding primary cluster. In some cases, each secondary cluster of plurality of secondary clusters 136 may include a dataset describing at least an event. For instance, under primary cluster of "fitness event," plurality of secondary clusters 136a-n may include a first secondary cluster of "cardio exercise" and a second secondary cluster of "strength training." Each secondary cluster of plurality of secondary clusters 136a-n includes a corresponding temporal interpolation 140. As used in this disclosure, a "temporal interpolation" is a data element representing a system understanding of a space between of provided plurality of data points. In an embodiment, temporal interpolation 140 may include an estimation of how one or more data points changes over time. In some cases, temporal interpolation 140 may include a data pattern representing at least a linkage between at least two secondary clusters of plurality of secondary clusters 136. In a non-limiting example, "fitness event" primary cluster may include a plurality of data points containing a first data point at "age 20" and a second data point at "age 30," a corresponding temporal interpolation may include a dataset describing estimations of entity's 120 fitness journey between these two ages. In some cases, temporal interpolation 140 may include a dataset describing data points transitions between at least two known event e.g., historical event within historical data 124. In a non-limiting example, temporal interpolation 140 may include a narrative that describe one or more events progression over time.

With continued reference to FIG. 1, in one or more embodiments, temporal interpolation 140 may include a linear interpolation, wherein the linear interpolation may be generated by processor 104 based on an assumption that plurality of data points may include a straight-line transition. In a non-limiting example, "fitness event" primary cluster may include a first data point (e.g., 70 bpm) related to a heart rate readings at a first TS and a third data point (e.g., 80 bpm) at a third TS but is missing a second TS, processor 104 may generate and correlate a linear temporal interpolation that estimate a second data point (e.g., 75 bpm) at the second TS with the primary cluster based on the rest of plurality of data points. In some cases, polynomial interpolation may be used. This may involve fitting a polynomial function to plurality of data points and using the polynomial function to estimate such missing value. In some cases, temporal interpolation 140 may be time-weighted, for example, and without limitation, closer data points (determined based on temporal element 116) may be given more weight in influencing the generation of interpolated data point. One or more machine learning models as described below may be used to generate temporal interpolation 140. Additionally, or alternatively, plurality of secondary clusters 136a-n may include one or more sub-combinations of secondary clusters to create a primary cluster as described above. In some cases, clustering raw data 112 may include combining a first primary cluster 132a of the at least two primary clusters 132a-b with a second primary cluster 132b of the at least two primary clusters 132a-b to form a composite primary cluster 144, wherein the composite primary cluster may include at least an intersection 148 of at least one secondary cluster of the plurality of secondary clusters 136.

With continued reference to FIG. 1, as used in this disclosure, a "composite primary cluster" is a cluster formed by merging two or more primary clusters, wherein plurality of data points from both primary clusters are combined based on one or more identification of significant overlap between data points of the original primary clusters, known as "intersections." In some cases, intersection 148 may include one or more shared data points, attributes, and/or characteristics between two or more (primary) clusters. In a non-limiting example, at least a secondary cluster of plurality of secondary clusters 136 associated with either primary clusters may include a "zone of overlap" where data points from multiple clusters coverage or show similarities. In some cases, processor 104 may identify one or more intersections 148 between plurality of secondary clusters belonging to different primary clusters, wherein each intersection may indicate a notable similarity or overlap between one or more secondary clusters even through they initially fall under deferent primary clusters. In a non-limiting example, processor 104 may use distance metrics e.g., Euclidean distance, Manhattan distance, or cosine similarity to quantify the "closeness" of data points. In some cases, data points (or secondary clusters) are close together according to the distance metrics may be considered similar. Other exemplary embodiments of metrics for identifying similarities such as, without limitation, correlation threshold, correlation coefficient, feature overlap, PCA, and the like may be used by processor 104. In some cases, presence of at least an intersection 148 may cause a depiction of the boundaries between at least two primary clusters 132a-b to be not shown, allowing processor 104 to refine or merge at least two primary clusters 132a-b for a more holistic representation of plurality of data points e.g., composite primary cluster 144. In a non-limiting example, processor 104 may evaluate which primary cluster tend to co-occur (of secondary clusters) with which other primary clusters; for instance, if raw data associated with "fitness event" primary cluster frequently exhibits patterns or characteristic similar to those in another primary cluster e.g., "dietary event," processor 104 may identify this tend and create composite primary cluster 144 such as "fitness x dietary" or "health and wellness" composite primary cluster. In this case, both "fitness event" primary cluster and "dietary event" primary cluster may include a shared secondary cluster "post-exercise meals" identified by processor 104 that signify an interplay between diet and exercise.

With continued reference to FIG. 1 in some cases, composite primary cluster 144 may include one or more shared temporal patterns. For example, and without limitation, if first primary cluster 132a and second primary cluster 132b, when combined by processor 104 to form composite primary cluster 144, exhibit overlapping or similar temporal patterns (e.g., a TS of increased gym activity aligning with a TS of a change in diet), corresponding temporal interpolation 140 may be used to reconcile (i.e., smooth out plurality of data points in) primary clusters 132a-b. In some cases, gaps or discrepancies (in the timeline) may be filled by temporal interpolations 140 when combining at least two primary clusters 132a-b. In a non-limiting example, at least two primary clusters may include an "outdoor events" primary cluster and a "mood trackers" primary cluster. Processor 104 may identify "outdoor events" primary cluster contain one or more data points showing hiking on certain weekends; however, processor 104 may identify "mood trackers" primary cluster have missing data points for those weekends, an "activity x mood" composite primary cluster, may use temporal interpolation 140 to estimate the mood on those hiking weekends based on surrounding mood-related data points and features related to known positive influence of outdoor events on mood extracted by processor 104 through feature leaning algorithm as described herein. Such temporal interpolation 140 may capture a time-based evolution and one or more interactions within merged primary and/or secondary clusters, providing a comprehensive and dynamic representation of the entity's data over time.

With continued reference to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance temporal interpolation as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of gene combinations with multiple disease states, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, in some cases, processor 104 may generate a k-means clustering algorithm receiving raw data 112 and outputs a definite number of classified data entry clusters e.g., at least two primary clusters 132a-b, wherein the at least two primary clusters 132a-b each contain a plurality of secondary clusters 136. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related historical data, which may be provided with, for example, entity and/or event cohort labels; this may, for instance, generate an initial set of entity and/or event cohort labels from a large volume of raw data of a large number of entities, and may also, upon subsequent iterations, identify new primary and/or secondary clusters of primary cluster to be provided new entity and/or event cohort labels, to which additional raw data may be classified, or to which previously classified raw data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $\text{argmin}_{c_i \in C} \text{dist}(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_i \ni S_i^{x_i}$. K-means clustering algorithm may continue to repeat these calculations until a stopping criterion has been satisfied such as when cluster data entries do not change clusters, the sum of the distances have been minimized, and/or some maximum number of iterations has been reached.

With continued reference to FIG. 1, k-means clustering algorithm may be configured to calculate a degree of similarity index value. A "degree of similarity index value" as used in this disclosure, includes a distance measurement indicating a measurement between each primary cluster and/or secondary cluster thereof generated by k-means clustering algorithm with raw data 112. Degree of similarity index value may indicate how close data points within raw data 112 such as, without limitation, age, geographic location, purchase history, browsing behavior, physiological parameters and/or the like are to being classified by k-means algorithm to a particular primary cluster and/or a secondary cluster. K-means clustering algorithm may evaluate the distances of plurality of data points to the k-number of clusters output by k-means clustering algorithm. Short distances between data points and a primary cluster may indicate a higher degree of similarity between data points and a particular cluster. Longer distances between data points and a cluster may indicate a lower degree of similarity between data points and a particular cluster.

With continued reference to FIG. 1, k-means clustering algorithm may select one or more classified primary clusters as a function of the degree of similarity index value. In an embodiment, k-means clustering algorithm may select a classified data entry cluster with the smallest degree of similarity index value indicating a high degree of similarity between a subset of data points and primary cluster. Alternatively, or additionally k-means clustering algorithm may select a plurality of primary clusters having low degree of similarity index values to data points in raw data 112, indicative of greater degrees of similarity. Degree of similarity index values may be compared to a threshold number indicating a minimal degree of relatedness suitable for inclusion of data points in a primary cluster, where degree of similarity indices a-n falling under the threshold number may be included as indicative of high degrees of relatedness. The above-described illustration of feature learning using k-means clustering is included for illustrative purposes only and should not be construed as limiting potential implementation of feature learning algorithms; persons skilled in the art, upon reviewing the entirety of this disclosure, will be aware of various additional or alternative feature learning approaches that may be used consistently with this disclosure.

With continued reference to FIG. 1, processor 104 is configured to rank plurality of secondary cluster 136 as a function of the corresponding temporal interpolations 140. Processor 104 may be configured to assess temporal interpolation 140 corresponding to each secondary cluster and ordering plurality of secondary clusters based on the assessment of temporal interpolations 140. In an embodiment, ranking plurality of secondary clusters 136 may include assigning a weight to corresponding temporal interpolation 140 of each secondary cluster of the plurality of secondary cluster. In some cases, weight may be computed based on the importance, relevance, accuracy, or other criteria derived from temporal interpolations 140. Processor 104 may then rank plurality of secondary clusters 136 as a function of assigned weights. In a non-limiting example, processor 104 may be configured to evaluate temporal interpolations 140 based on the confidence in the interpolated data, importance of the time interval in question, potential impact of interpolated data on overall progression model as described in detail below, among others. In some cases, temporal interpolations 140 derived from closely spaced data points may be considered more reliable (i.e., have higher confidence level) than those derived from sparsely spaced data points. For instance, if one secondary cluster contains interpolated heart rate data derived from measurements spaced 10 minutes apart, and another cluster contains interpolations from measurements spaced 1 hour apart, the former may be ranked higher due to higher confidence level of closely spaced interpolations. In another non-limiting example, for a secondary cluster within "fitness event" primary cluster, if there is interpolated data regarding an entity's e.g., athlete's performance right before a major competition, this secondary cluster may be ranked higher than other secondary clusters having interpolations during an athlete's off-season. In other cases, processor 104 may consider the relevance or importance of specific temporal interpolations in context to entity's goals or purposes, for example, and without limitation, for a secondary cluster within "financial activities" primary cluster, temporal interpolations related to significant market events or crashes may rank higher than temporal interpolations on more regular days. In some cases, processor 104 may be configured to save primary cluster with a pre-determined number of secondary clusters (e.g., top n secondary clusters) in database 128 once plurality of secondary clusters 136 has been ranked.

With continued reference to FIG. 1, processor 104 is configured to determine an extrapolation 152 for each secondary clusters of the ranked plurality of secondary clusters 136 based on conditioned raw data 112. As used in this disclosure, a "extrapolation" is a data element related to inferred values outside the range of observed data points within primary and/or secondary clusters. In some cases, extrapolation 152 may be associated with a second temporal element, wherein the second temporal element may be subsequent to temporal element 116 as described above. In an embodiment, extrapolation 152 may include predicted or deduced values or trends that lie outside the range of the currently available data points. In a non-limiting example, processor 104 may determine extrapolation 152 describing entity's fitness level at age 40 based on plurality of secondary clusters within "fitness event" primary cluster having plurality of data points related to ages 20-30. In some cases, extrapolation 152 may include at least a possible outcome, consequences, or occurrences of similar events in the future (or in the past) based on known data patterns as described above; for example, and without limitation, extrapolation 152 may include, without limitation, future player performance, economic events, natural events, social events, and/or the like, depends on secondary cluster in question.

With continued reference to FIG. 1, in some cases, processor 104 may use a machine learning module to implement one or more algorithms or generate one or more machine learning models to determine extrapolation 152. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 128 as described herein or any other data sources, or even be provided by entity 120. In a non-limiting example, machine-learning module may obtain a training set by querying database 128 that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In a further embodiment, training data may include previous outputs such that one or more machine learning models iteratively produces outputs.

With continued reference to FIG. 1, in one or more embodiments, processor 104 may implement one or more aspects of "generative artificial intelligence(AI)," a type of AI that uses machine learning algorithms to create, establish, or otherwise generate data such as, without limitation, extrapolation 152 that is similar to one or more provided training examples. In an embodiment, machine learning module described herein may generate one or more generative machine learning models such as, without limitation, an extrapolation generator 156 that are trained on one or more sets of extrapolation training examples. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

With continued reference to FIG. 1, in a non-limiting example, extrapolation generator 156 may include a generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 2.

With continued reference to FIG. 1, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in further detail below with reference to FIG. 2 to distinguish between different categories e.g., real vs. fake or states e.g., TRUE vs. FALSE within the context of generated data such as, without limitations, extrapolations 152 for each secondary clusters of plurality of secondary clusters 136, and/or the like. In some cases, processor 104 may implement one or more classification algorithms such as, without limitation, Support Vector Machines (SVM), Logistic Regression, Decision Trees, and/or the like to define decision boundaries.

With continued reference to FIG. 1, in a non-limiting example, processor 104 may utilize a GAN to generate one or more extrapolations for each secondary cluster of plurality of secondary clusters 136 that use conditioned raw data 112 as a base. In some cases, processor 104 may be configured to normalize or standardize conditioned data 112 to ensure consistent scaling during the GAN's training process. In some cases, generator of GAN may be configured to produce realistic extrapolations based on user input. In some cases, instead of training GAN using extrapolation training examples, GAN may take random noise (or potentially seed data) as input and produce datasets that resemble future extrapolations for a given secondary cluster. Discriminator may then evaluate generated further extrapolation against conditioned raw data 112, wherein conditioned raw data may serve as "real data" i.e., benchmarks for the discriminator. Generator of GAN may be iteratively trained based on feedback from discriminator. In some cases, this adversarial process may repeat until the generator produce at least one extrapolations 152 that the discriminator can hardly distinguish from real conditioned data 112. In some cases, conditioned raw data may be augmented by introducing slight variations. In some cases, additional raw data as described below may be provided, and one or more hyperparameters may be fine-tuned (based on discriminator's feedback) to improve the performance of extrapolation generator 156. This can help increase the robustness of the GAN model by providing it with a more diverse dataset. In some cases, extrapolation generator 156 may include a plurality of GANs, each being designated to a secondary cluster and adapted based on the unique characteristics of the secondary cluster.

With continued reference to FIG. 1, processor 104 is configured to generate a progression model 160 as a function of extrapolations 152. As used in this disclosure, a "progression model" is a computation or mathematical representation that describes a development, evolution, or trajectory of entity 120 over time based on conditioned raw data 112 which includes (primary and/or secondary) clustered data and temporal interpolations 140 as described above. In a non-limiting example, progression model 160 may be configured to aid in understanding how entity 120 has progressed from first temporal element 116 (e.g., the past) and how it may evolve at or beyond second temporal element 116 (e.g., the future). In some cases, progression model 160 may include a sequence of events, wherein the sequence of events may include historical events and/or future events. In some cases, progression model 160 may include a time-series representation where extrapolations 152 (and events) may be mapped against a defined time interval. In a non-limiting example, progression model 160 may include a company's quarterly revenue over next few years. In some cases, progression model 160 may include a growth curve, wherein the growth curve may represent growth or development of entity 120 over time using one or more curves (it may be linear, exponential or follow some other growth patterns). In a non-limiting example, progression model 160 may show the growth of a social media influencer's followers over time. In another non-limiting example, progression model 160 may include different life cycle (i.e., extrapolations 152) of a product or a tech gadget in the market. In some cases, progression model 160 may also describe an evolution of behaviors or data patterns over time, for example, and without limitation, progression model 160 may include a user's dietary habits over a decade, showing shifts from a high-crab diet to a balanced diet (i.e., conditioned raw data 112), and then to a vegan diet (i.e., extrapolation 152). In case where extrapolations 152 are new events generated based on conditioned raw data 112, progression model 160 may include one or more specific achievements or stages that are critical such as, without limitation, milestones like initial funding, product launch, first profit, expansion, acquisition, and/or the like.

With continued reference to FIG. 1, in some cases, generating progression model 160 may be generated using one or more machine learning models as described herein such as, without limitation, decision trees, neural networks, random forest, support vector machines (SVM). In a non-limiting example, machine learning module may be configured to generate a progression model generator trained using conditioned raw data. In some cases, extrapolations 152 determined for plurality of secondary clusters may be used as input for the progression model generator and one or more progression models may be the output. In some cases, one or more statistical models may be used as progression model 160 constructed based on one or more mathematical principle e.g., linear regression, time series model such as Autoregressive Integrated Moving Average (ARIMA), ANOVA for variance analysis, among others. Additionally, or alternatively, processor 104 may be further configured to adjust progression model 160 as a function of additional raw data. In some cases, additional raw data may include, without limitation, updated entity data, feedback data, external data from third party, comparative data such as data from other similar entities, and/or the like. In a non-limiting example, additional raw data may include feedback on the accuracy or relevance of progression model's 160 predictions or extrapolations 152. For instance, and without limitation, if model predicted a user's fitness level would be "x" in 6 months, and 6 months later, the actual fitness level is "y," the difference "y-x" may be a feedback. In some cases, processor 104 may use such feedback to adjust progression model 160 by incorporating additional raw data into existing dataset and retraining machine learning models e.g., progression model generator, extrapolation generator 156, and/or the like, adjusting weights assigned to temporal interpolation 140 based on additional raw data, among others.

With continued reference to FIG. 1, processor 104 may be further configured to generate a visual interface data structure 164, wherein the visual interface data structure 164 may include a visualization of progression model 160 in a desired display format and display the visual interface data structure 164 through a user interface 168 at a display device 172. As used in this disclosure, a "visual interface data structure" is a specific organization or arrangement of data meant for visual representation. In some cases, visual interface data structure may design to showcase progression model 160, guide how progression model 160 is presented and interacted with. In some cases, visualization of progression model 160 may include a graphical representation of progression model 160, for example, and without limitation, this may include a simple line graph showing a trend over time, a 3D model, or even an animated representation showing how entity 120 changes based on different temporal interpolations 140 and extrapolations 152. In some cases, display format may control how progression model 160 is visualized. In some cases, desired display format may be set by user based on a user input. In a non-limiting example, user may interact with a toggler to switch between a plurality of visual formats, such as, table, bar charts, pie charts, scatter plots, heat maps, and/or the like depending on the user preference and/or complexity of progression model 160.

With continued reference to FIG. 1, in some cases, progression model 160 may be transmitted, by processor 104, to one or more display devices 172 communicatively connected to processor 104, for example, and without limitation, user devices having at least one display capable of presenting a graphical user interface (GUI) to end user e.g., entity 120. As used in this disclosure, a "display device" refers to an electronic device that visually presents information to the user. In some cases, display device 172 may be configured to project or show visual content generated by computers, video devices, or other electronic mechanisms. In some cases, display devices may include, without limitation, a liquid crystal display (LCD), a cathode ray tube (CRT), a plasma display, a light emitting diode (LED) display, and any combinations thereof. In a non-limiting example, one or more display devices 172 may vary in size, resolution, technology, and functionality. Display device 172 may be able to show data described herein and/or visual elements in various format such as textural, graphical, video among others, in either monochrome or color. A "graphical user interface (GUI)," as used herein, is a graphical form of user interface that allows entity 120 to interact with apparatus 100. In some embodiments, GUI may include icons, menus, other visual indicators, or representations (graphics), audio indicators such as primary notation, and display information and related user controls. In one or more embodiments, GUI may serve as a primary medium through which progression model 160 and any other relevant data may be present to entity 120. In some cases, event may also include a change in GUI, such as, without limitation, presentation of a new module, adjustment of content display, initiation of a feedback loop, and/or the like. In a non-limiting example, GUI may be designed to capture feedback (e.g., user input) from entity 120 regarding the relevance and accuracy of progression model 160 and/or determined extrapolations 152, allowing processor 104 to continuously refine one or more processing steps described herein.

With continued reference to FIG. 1, in a non-limiting example, visual interface data structure 164 may include a progression model 160 visualized in a plurality of sections. In some cases, visual interface data structure may include a model label, for example, model label may include a name indicating type of progression model being viewed e.g., "Fitness Progression Over time. In some cases, primary clusters 132*a-b* may be displayed, in forms of tabs or dropdowns, allowing user to navigate between them. In case where more than one progression models are generated. Visual interface data structure may include a navigation bar configured to switch between different models or datasets. In some cases, visual interface data structure 164 may include a main visual e.g., a central graph or chart that display progression model. In a non-limiting example, this may include a line graph showing trends over time, a bar graph comparing different primary clusters and/or secondary clusters' extrapolations, a scatter plot showing relationships between different primary clusters, and/or the like. In one or more embodiment, visual interface data structure may include a time slider, wherein the time slider may allow users to adjust first temporal element 116 and/or second temporal element (and their associated model or at least a portion of the model) being displayed within main visual. In some cases, plurality of data points e.g., clickable markers or areas on the main visual that, when selected by the user, visual interface data structure 164 may provide detailed information such as, without limitation, exact figures, dates, or events details represented in progression model 160. In some cases, one or more annotations i.e., text boxes or pop-ups may be displayed, wherein the annotations may include one or more explanations for specific trends, anomalies, or events in generated progression model 160. In some cases, users may refine displayed model through one or more sidebar or panels that are implemented with parameter controls e.g., filtering by age range, specific event types, or categories. In some cases, a set of data points may be overlayed on to the progression model 160, for example, and without limitation, user may interact with one or more checkboxes or switches that overlay data points within "health" primary cluster onto the "fitness" progression model. Additionally, or alternatively, extrapolations 152 may be display in at least a section within visual interface data structure 164. In some cases, visual interface data structure 164 may be exported to various digital file format e.g., CSV, PDF, PNG, or the like.

Figure 2:
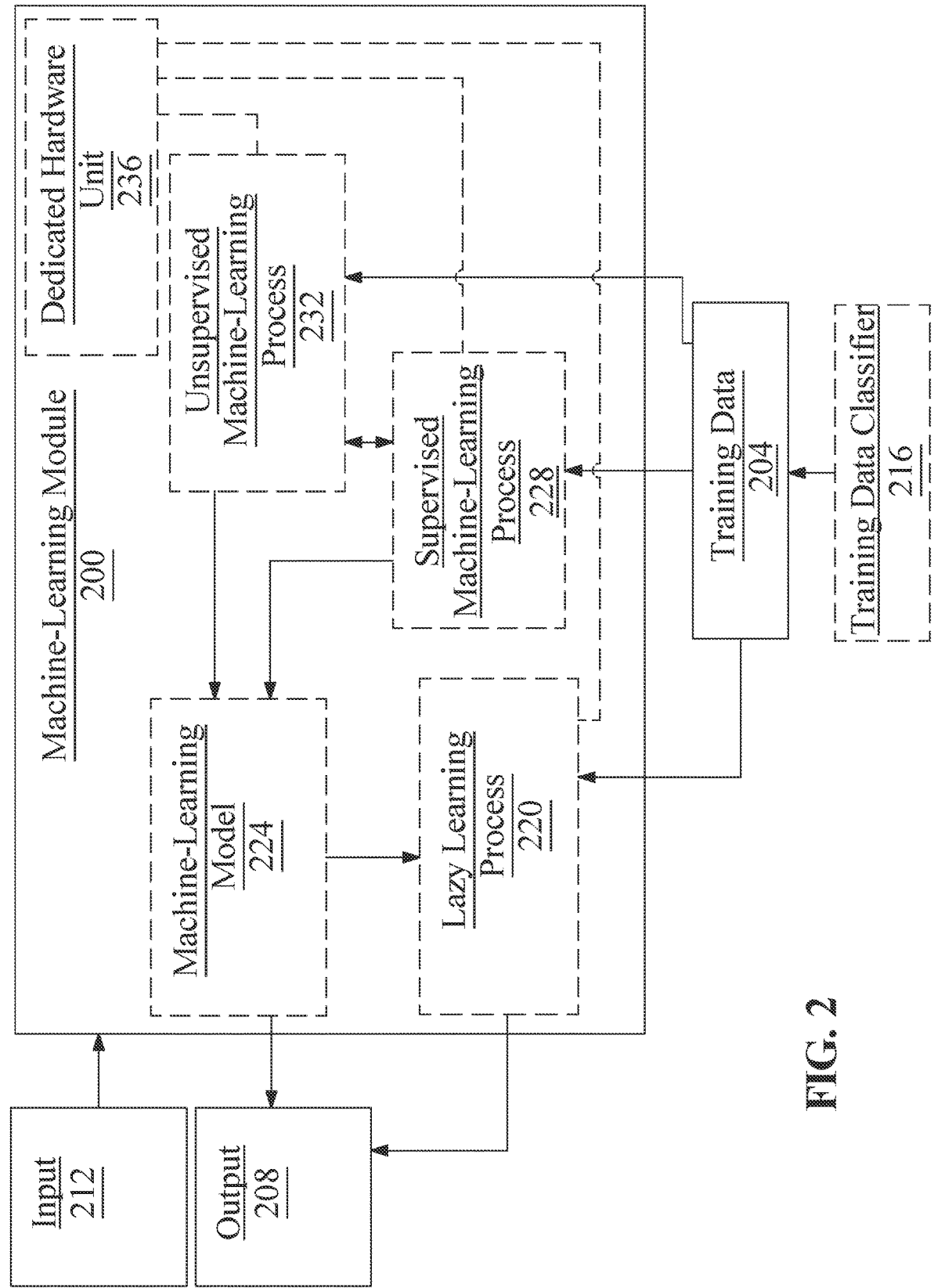
FIG. 2 is a block diagram of an exemplary embodiment of a machine learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, training data may include conditioned raw data as described above, such as a plurality of data points correlated to a plurality of primary clusters and secondary clusters (i.e., labels).

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to a plurality of sub-categories such as secondary clusters as described above.

Still referring to FIG. 2, computing device 204 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 204 may then calculate a likelihood table by calculating probabilities of different data entries and classification labels. Computing device 204 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, computing device 204 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, santization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include conditioned raw data as described above as inputs, a plurality of extrapolations as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
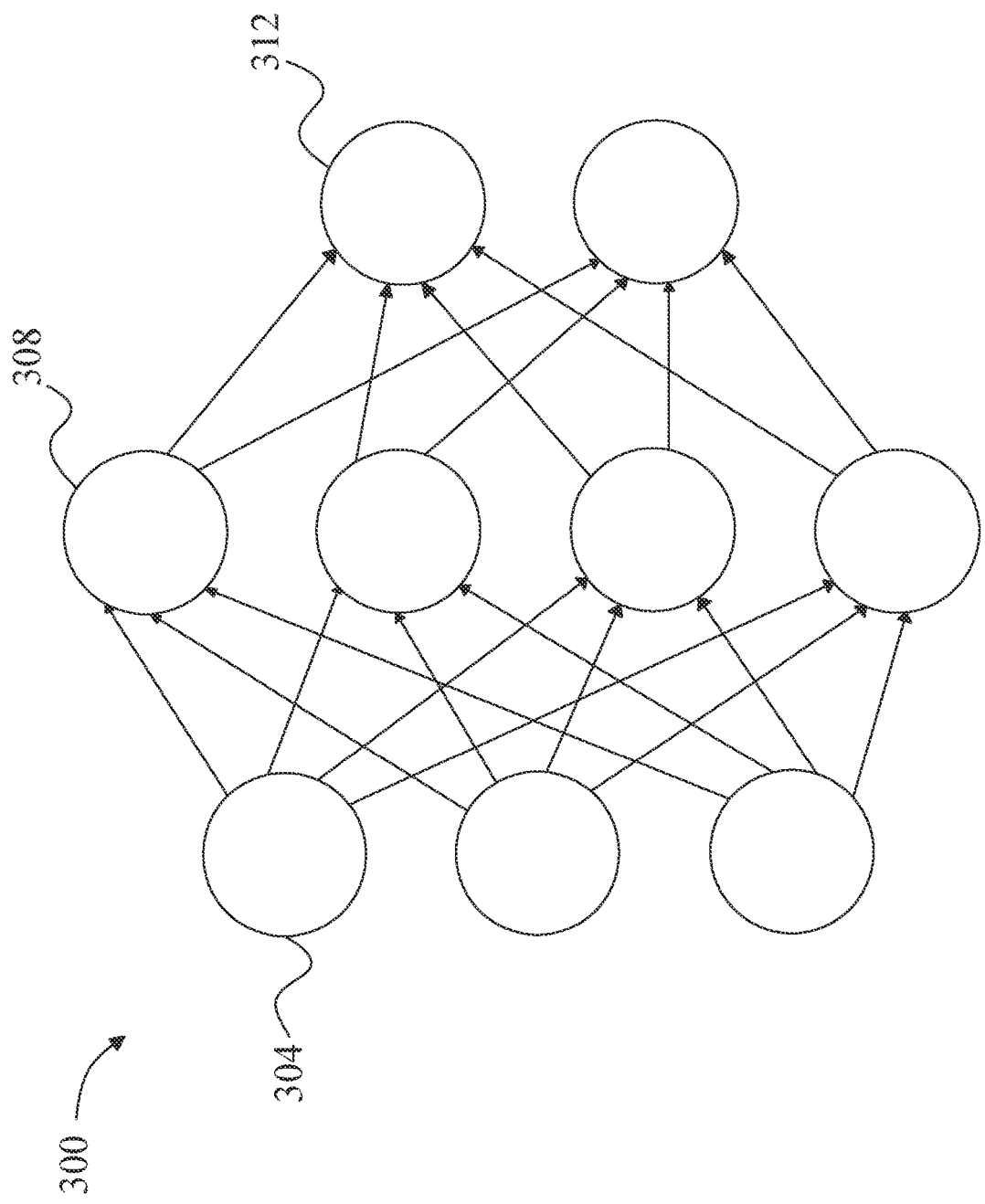
FIG. 3 is a diagram of an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. In a non-limiting embodiment, input layer of nodes 304 may include any remote display where user inputs may be provided from, while output layer of nodes 312 may include either the local device if it has the processing capability to support the requisite machine-learning processes, or output layer of nodes 312 may refer to a centralized, network connected processor able to remotely conduct the machine-learning processes described herein. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

With continued reference to FIG. 3, in an embodiment, neural network may include a deep neural network (DNN). As used in this disclosure, a "deep neural network" is defined as a neural network with two or more hidden layers. In a non-limiting example, neural network may include a convolutional neural network (CNN). A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., raw data through a sliding window approach. In some cases, convolution operations may enable processor 104 to detect local/global data patterns and any other features described herein within input data. Features within input data may be passed through one or more activation functions, such as without limitation, Rectified Linear Unit (ReLU), to introduce non-linearities into one or more generating and/or determining processing steps as described above with reference to FIGS. 1-2 Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the dimensions of feature maps by applying downsampling, such as max-pooling or average pooling, to small, non-overlapping regions of one or more features.

Still referring to FIG. 3, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, temporal interpolation and/or extrapolation. Further, each fully connected layer may be followed by one or more dropout layers configured to prevent overfitting, and one or more normalization layers to stabilize the learning process described herein.

With continued reference to FIG. 3, in an embodiment, training the neural network (i.e., CNN) may include selecting a suitable loss function to guide the training process. In a non-limiting example, a loss function that measures the difference between the predicted output and the ground truth (e.g., conditioned raw data) may be used, such as, without limitation, mean squared error (MSE) or a custom loss function may be designed for one or more embodiments described herein. Additionally, or alternatively, optimization algorithms, such as stochastic gradient descent (SGD), may then be used to adjust CNN's parameters to minimize such loss. In a further non-limiting embodiment, instead of directly predicting classification or category of input data, CNN may be trained as a regression model to predict numerical output such as numerical temporal interpolations or extrapolations as described above with reference to FIG. 1. Additionally, CNN may be extended with additional deep learning techniques, such as recurrent neural networks (RNNs) or attention mechanism, to capture additional features and/or data relationships within input data.

Figure 4:
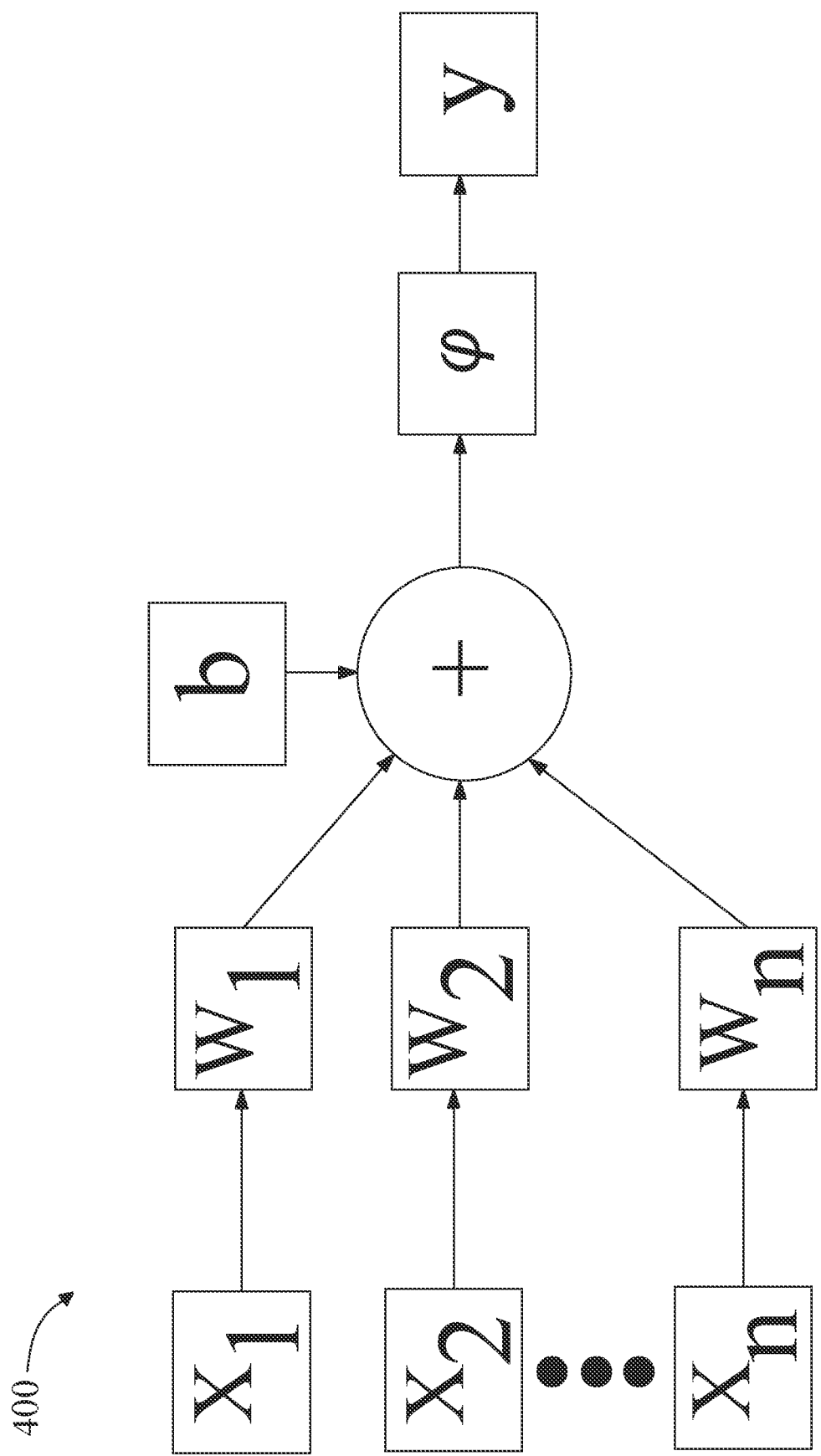
FIG. 4 is a block diagram of an exemplary embodiment of a node of a neural network.

Referring now to FIG. 4, an exemplary embodiment of a node 500 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
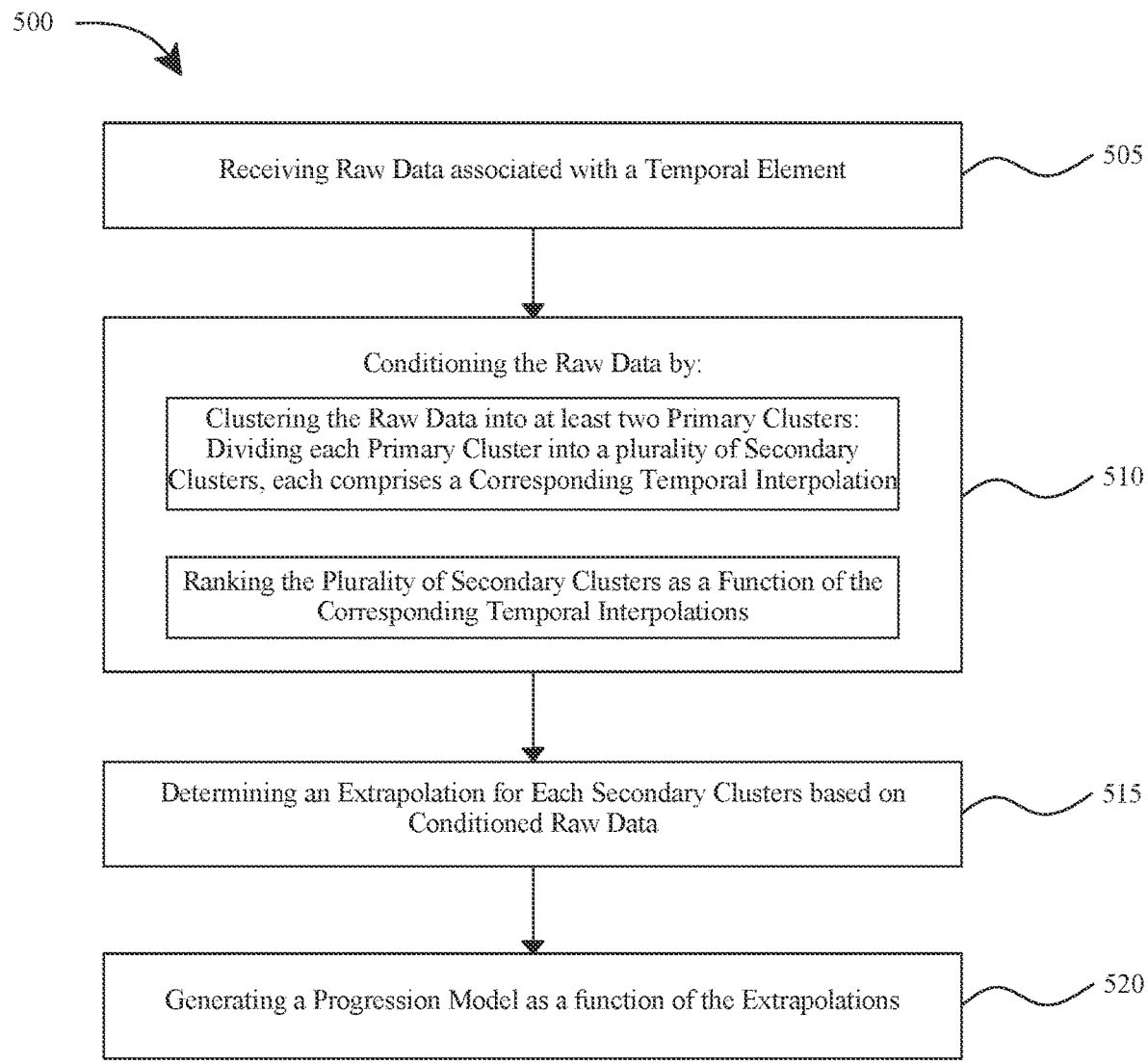
FIG. 5 is a flow diagram of an exemplary embodiment of a method for conditioning raw data based on temporal interpolations to generate optimal extrapolations of an entity.

Now referring to FIG. 5, a flow diagram of an exemplary embodiment of a method 500 for conditioning raw data based on temporal interpolations to generate optimal extrapolations of an entity is illustrated. Method 500 includes a step 505 of receiving, by at least a processor, raw data associated with a temporal element from an entity. In some embodiments, raw data may include historical data pertaining to the entity. This may be implemented, without limitation, as described above with reference to FIGS. 1-4.

With continued reference to FIG. 5, method 500 includes a step 510 of conditioning, by the at least a processor, the raw data, wherein conditioning the raw data includes clustering the raw data into at least two primary clusters, wherein clustering the raw data into the at least two primary clusters may include dividing each primary cluster into a plurality of secondary clusters, wherein each secondary cluster of the plurality of secondary clusters includes a corresponding temporal interpolation, and ranking the plurality of secondary clusters as a function of the corresponding temporal interpolations. In some embodiments, clustering the raw data may include combining a first primary cluster of the at least two primary clusters with a second primary cluster of the at least two primary clusters to form a composite primary clusters, wherein the composite primary cluster represents at least an intersection of at least one secondary cluster of the plurality of secondary clusters. In some embodiments, each secondary cluster of the plurality of secondary clusters may include a dataset describing at least an event. In some embodiments, the temporal interpolation may include a data pattern representing at least a linkage between at least two secondary clusters of the plurality of secondary clusters. In some embodiments, ranking the plurality of secondary clusters may include assigning a weight to the corresponding temporal interpolation of each secondary cluster of the plurality of secondary cluster, and ranking the plurality of secondary clusters as a function of the assigned weights. This may be implemented, without limitation, as described above with reference to FIGS. 1-4.

With continued reference to FIG. 5, method 500 includes a step 515 of determining, by at least a processor, an extrapolation for each secondary clusters of the ranked plurality of secondary clusters based on the conditioned raw data. In some embodiments, determining the extrapolation may include training an extrapolation generator using the conditioned raw data and determining the extrapolation for each secondary cluster of the plurality of secondary clusters using the trained extrapolation generator. In some embodiments, the extrapolation generator may include a generative adversarial network (GAN). This may be implemented, without limitation, as described above with reference to FIGS. 1-4.

With continued reference to FIG. 5, method 500 includes a step 520 of generating, by the at least a processor, a progression model as a function of the extrapolations. In some embodiments, method 500 may further include a step of adjusting, by the at least a processor, the progression model as a function of additional raw data. In some embodiments, method 500 may further include a step of generating, by the at least a processor, a visual interface data structure, wherein the visual interface data structure comprises a visualization of the progression model in a desired display format, and displaying, by the at least a processor, the visual interface data structure through a user interface at a display device. This may be implemented, without limitation, as described above with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
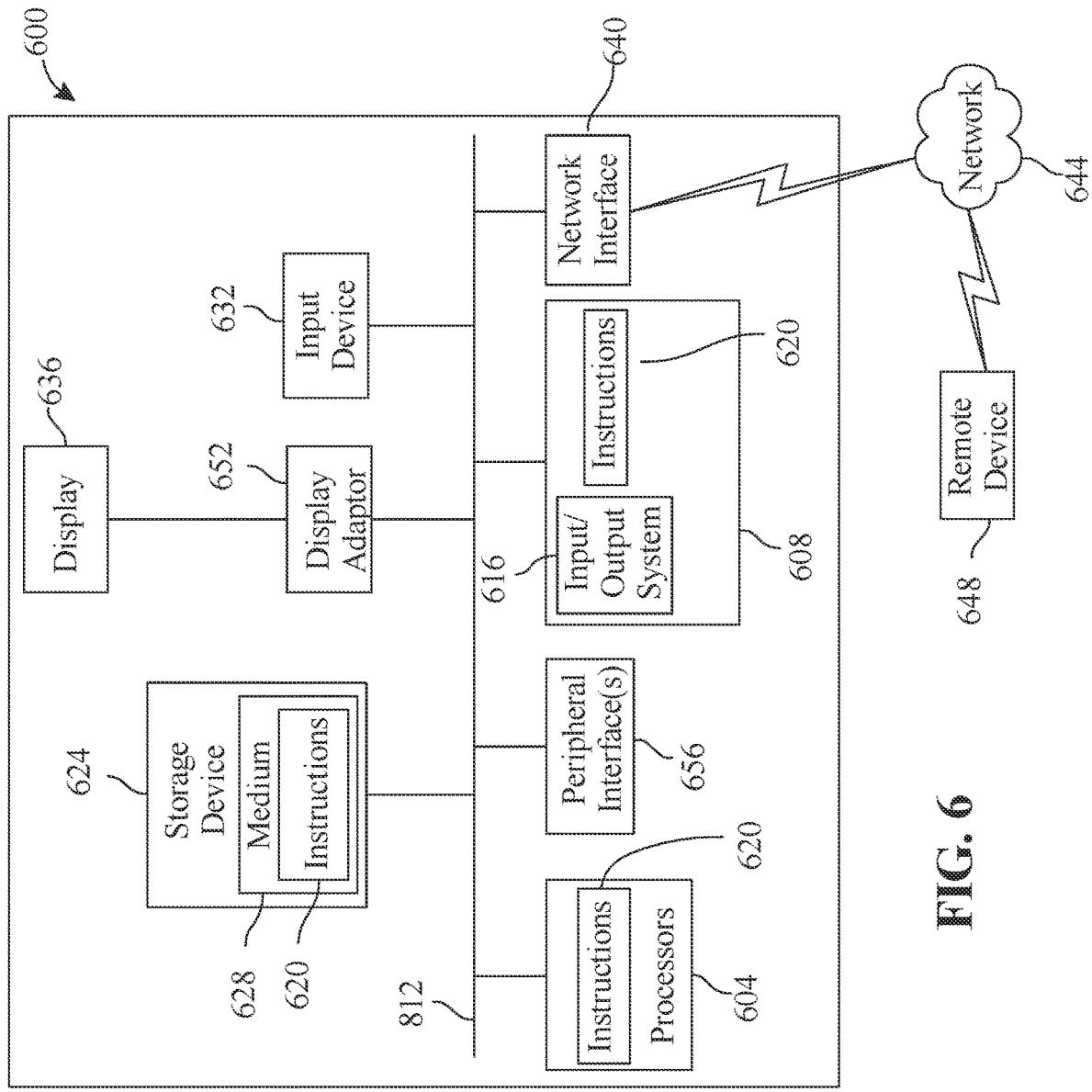
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for conditioning raw data based on temporal interpolations to generate optimal extrapolations of an entity, wherein the apparatus comprises:
   at least a processor; and
   a memory communicatively connected to the at least a processor, wherein the memory contains instructions configuring the at least a processor to:
      receive raw data associated with a temporal element from an entity;
      condition the raw data, wherein conditioning the raw data comprises:
         clustering the raw data into at least two primary clusters, wherein clustering the raw data into at least two primary clusters comprises dividing each primary cluster into a plurality of secondary clusters, wherein each secondary cluster of the plurality of secondary clusters comprises a corresponding temporal interpolation; and
         ranking the plurality of secondary clusters as a function of the corresponding temporal interpolations, wherein ranking the plurality of secondary clusters comprises:
            assigning a weight to the corresponding temporal interpolation of each secondary cluster of the plurality of secondary clusters as a function of spacing between data points in the corresponding temporal interpolation of each secondary clusters; and
            ranking the plurality of secondary clusters as a function of the assigned weights;
      determine an extrapolation for each secondary cluster of the ranked plurality of secondary clusters based on the conditioned raw data; and
      generate a progression model as a function of the extrapolations.

2. The apparatus of claim 1, wherein the raw data comprises historical data pertaining to the entity.

3. The apparatus of claim 1, wherein clustering the raw data comprises:
   combining a first primary cluster of the at least two primary clusters with a second primary cluster of the at least two primary clusters to form a composite primary cluster, wherein the composite primary cluster represents at least an intersection of at least one secondary cluster of the plurality of secondary clusters.

4. The apparatus of claim 1, wherein each secondary cluster of the plurality of secondary clusters comprises a dataset describing at least an event.

5. The apparatus of claim 1, wherein the temporal interpolation comprises:
   a data pattern representing at least a linkage between at least two secondary clusters of the plurality of secondary clusters.

6. The apparatus of claim 1, wherein determining the extrapolation comprises:
   training an extrapolation generator using the conditioned raw data; and
   determining the extrapolation for each secondary cluster of the plurality of secondary clusters using the trained extrapolation generator.

7. The apparatus of claim 6, wherein the extrapolation generator comprises a generative adversarial network (GAN).

8. The apparatus of claim 1, wherein the memory further contains instructions configuring the at least a processor to adjust the progression model as a function of additional raw data.

9. The apparatus of claim 1, wherein the memory further contains instructions configuring the at least a processor to:
   generate a visual interface data structure, wherein the visual interface data structure comprises a visualization of the progression model in a desired display format; and
   display the visual interface data structure through a user interface at a display device.

10. The apparatus of claim 1, wherein the memory further contains instructions configuring the at least a processor to:
    receive additional raw data associated with the temporal element from the entity;
    adjust the assigned weight of the corresponding temporal interpolation of each secondary cluster of the plurality of secondary clusters as a function of the additional raw data; and
    adjust the progression model as a function of the adjusted assigned weights.

11. A method for conditioning raw data based on temporal interpolations to generate optimal extrapolations of an entity, wherein the method comprises:
    receiving, by at least a processor, raw data associated with a temporal element from an entity;
    conditioning, by the at least a processor, the raw data, wherein conditioning the raw data comprises:
       clustering the raw data into at least two primary clusters, wherein clustering the raw data into the at least two primary clusters comprises:
          dividing each primary cluster into a plurality of secondary clusters, wherein each secondary cluster of the plurality of secondary clusters comprises a corresponding temporal interpolation; and
          ranking the plurality of secondary clusters as a function of the corresponding temporal interpolations, wherein ranking the plurality of secondary clusters comprises:
             assigning a weight to the corresponding temporal interpolation of each secondary cluster of the plurality of secondary clusters as a function of spacing between data points in the corresponding temporal interpolation of each secondary clusters; and ranking the plurality of secondary clusters as a function of the assigned weights;

determining, by the at least a processor, an extrapolation for each secondary cluster of the ranked plurality of secondary clusters based on the conditioned raw data; and generating, by the at least a processor, a progression model as a function of the extrapolations.

12. The method of claim 11, wherein the raw data comprises historical data pertaining to the entity.

13. The method of claim 11, wherein clustering the raw data comprises:

combining a first primary cluster of the at least two primary clusters with a second primary cluster of the at least two primary clusters to form a composite primary clusters, wherein the composite primary cluster represents at least an intersection of at least one secondary cluster of the plurality of secondary clusters.

14. The method of claim 11, wherein each secondary cluster of the plurality of secondary clusters comprises a dataset describing at least an event.

15. The method of claim 11, wherein the temporal interpolation comprises:

a data pattern representing at least a linkage between at least two secondary clusters of the plurality of secondary clusters.

16. The method of claim 11, wherein determining the extrapolation comprises:

training an extrapolation generator using the conditioned raw data; and determining the extrapolation for each secondary cluster of the plurality of secondary clusters using the trained extrapolation generator.

17. The method of claim 16, wherein the extrapolation generator comprises a generative adversarial network (GAN).

18. The method of claim 11, further comprises:

adjusting, by the at least a processor, the progression model as a function of additional raw data.

19. The method of claim 11, further comprises:

generating, by the at least a processor, a visual interface data structure, wherein the visual interface data structure comprises a visualization of the progression model in a desired display format; and displaying, by the at least a processor, the visual interface data structure through a user interface at a display device.

20. The method of claim 11, wherein the method further comprises:

receiving, by the at least a processor, additional raw data associated with the temporal element from the entity;

adjusting, by the at least a processor, the assigned weight of the corresponding temporal interpolation of each secondary cluster of the plurality of secondary clusters as a function of the additional raw data; and adjusting, by the at least a processor, the progression model as a function of the adjusted assigned weights.

* * * * *